United States Patent [19]
Hackett

[11] Patent Number: 4,877,223
[45] Date of Patent: Oct. 31, 1989

[54] LOAD LEVELING SHOCK ABSORBER

[75] Inventor: Jeffrey K. Hackett, P.O. Box 68, Benedict, Minn. 56436

[73] Assignee: Jeffrey K. Hackett, Benedict, Minn.

[21] Appl. No.: 247,248

[22] Filed: Sep. 21, 1988

[51] Int. Cl.⁴ ............................................. F16F 9/342
[52] U.S. Cl. .............................. 267/64.17; 267/64.18; 267/64.19
[58] Field of Search ............... 267/64.16, 64.17, 64.18, 267/64.19, 64.21, 64.22, 64.23, 64.24, 64.26; 280/709, 714

[56] References Cited

U.S. PATENT DOCUMENTS

| | | |
|---|---|---|
| 2,048,285 | 7/1936 | Padgett . |
| 2,719,611 | 10/1955 | De Previnquieres . |
| 3,151,856 | 10/1964 | Bresk et al. . |
| 3,178,167 | 4/1965 | Loewis ............................ 267/64.21 |
| 3,226,103 | 12/1965 | McNenny . |
| 3,525,512 | 8/1970 | Hagwood . |
| 3,527,451 | 9/1970 | Long ............................... 267/64.21 |
| 3,563,565 | 2/1971 | Perlini ................................. 280/96 |
| 3,593,977 | 7/1971 | Hahn ............................... 267/64.19 |
| 3,752,270 | 8/1973 | Valdespino ........................ 188/281 |
| 3,874,485 | 4/1975 | Smith ................................ 188/298 |
| 3,891,199 | 6/1975 | Willich et al. .................... 267/139 |
| 3,904,183 | 9/1975 | Allinquant et al. ............... 267/64.17 |
| 4,154,434 | 5/1979 | Wallis ................................ 267/119 |
| 4,405,119 | 9/1983 | Masclet et al. ............... 267/64.26 X |
| 4,445,673 | 5/1984 | Clark .............................. 267/64.24 |

Primary Examiner—Duane A. Reger
Attorney, Agent, or Firm—Kinney & Lange

[57] ABSTRACT

A hydraulic shock absorber unit provides automatic maintenance of a predetermined spacing between a sprung load and an unsprung portion where the mass of the sprung load is subject to change. The shock absorber unit includes a liquid filled cylinder in a cylinder body with a piston disposed in the cylinder for dividing the cylinder into a variable volume compression chamber and a variable volume rebound chamber. The piston is axially reciprocable within the cylinder and operates as a pump for a self-leveling fluid circuit. The shock absorber is connected between the sprung load and the unsprung load such that piston has a fixed spacing relative to a point on one of the loads, typically the sprung load. The cylinder has a fixed spacing relative to a point on the unsprung load. A lift chamber is axially disposed between the cylinder body and the sprung load for returning the shock absorber to a predetermined extension during transient loading conditions. A fluid circuit delivers fluid to the lift chamber during compression strokes of the piston for varying pressure in the lift chamber as a function of the mass of the sprung load. A bleed valve drains fluid from the lift bladder when the shock absorber extension exceeds the predetermined spacing. A fluid circuit recirculates fluid from the lift chamber to the compression and rebound chambers as required for normal damping of transient oscillations of the sprung load.

21 Claims, 3 Drawing Sheets

LOAD LEVELING SHOCK ABSORBER

BACKGROUND OF THE INVENTION

1. Field of the Invention

The present invention relates to load leveling shock absorbers and more particularly to a telescoping hydraulic shock absorber providing automatic level adjustment to a predetermined extension of the shock absorber.

2. Technical Background

An automobile has a preferred spacing between a sprung portion of the automobile which carries the passengers, power plant, fuel and luggage, and an unsprung portion of the automobile which includes the running gear in contact with the surface over which the automobile travels. Variation in the total load or in the position of passengers, luggage, trailers and fuel carried by the automobile can compromise the preferred spacing at any given point of support.

A number of techniques have been proposed in the prior art for providing leveling and/or compensation for load variation in vehicles. Variable rate springs help limit the variation in spacing between sprung and unsprung portion. Another solution provides air shock absorbers which can be pressurized to support heavier loads. Some vehicles using air shocks require the driver to visit a service station or other source of pressurized air for pressurizing the shocks. Some vehicles carry an onboard air pump for pressurizing the air shocks. A few vehicles have sophisticated onboard computer systems and onboard pumps, for both air and damping liquid, to detect vehicle height for variation in load weight and distribution.

A simple, yet purely mechanical solution to vehicle level adjustment, compatible for installation on existing automobiles as a replacement shock absorber would provide numerous advantages over the prior art.

SUMMARY OF THE INVENTION

A telescoping hydraulic shock absorber unit provides automatic maintenance of a predetermined spacing between a sprung load and an unsprung load where the mass of the sprung load is subject to variation. The shock absorber unit includes a cylinder filled with a damping liquid, such as hydraulic fluids, transmission oils, or another relatively incompressible fluid. A piston is disposed for axial reciprocation in the cylinder, dividing the cylinder into a variable volume compression chamber and a variable volume rebound chamber for damping oscillations stemming from transient loads. A lift chamber includes a damping liquid receiving plenum of variable volume and a compression portion.

The shock absorber is connected between the sprung load and the unsprung load such that piston has a fixed spacing relative to a point on one of the loads, typically the sprung load. The cylinder has a fixed spacing relative to a point on the unsprung load. A normal extension of the shock absorber corresponds with a preferred spacing of the sprung and unsprung loads. The piston operates as a pump for pressurizing the lift chamber with damping liquid after an increase in loading. Liquid is drained from the lift bladder when extension of the shock absorber exceeds the predetermined extension.

Damping liquid is recirculated within the shock absorber in a fluid circuit. The fluid circuit includes a one-way valve which delivers damping liquid to the lift chamber during compression strokes of the piston increasing fluid pressure in the lift chamber to support the increased load. A bleed valve drains damping liquid from the lift chamber when extension of the shock absorber exceeds the preferred spacing. Liquid is drained from the lift chamber to an extensible reservoir. The lift chamber includes a flexible wall portion allowing liquid in the lift chamber to be displaced during compression strokes of the shock absorber unit.

The extensible reservoir completes the fluid circuit by storing reserve liquid, providing for expansion of the liquid resulting from temperature increases of the liquid and supplying damping liquid to the compression and rebound chambers as required for normal damping of transient movements of the sprung load.

DETAILED DESCRIPTION OF THE PREFERRED EMBODIMENTS

Figure 1:
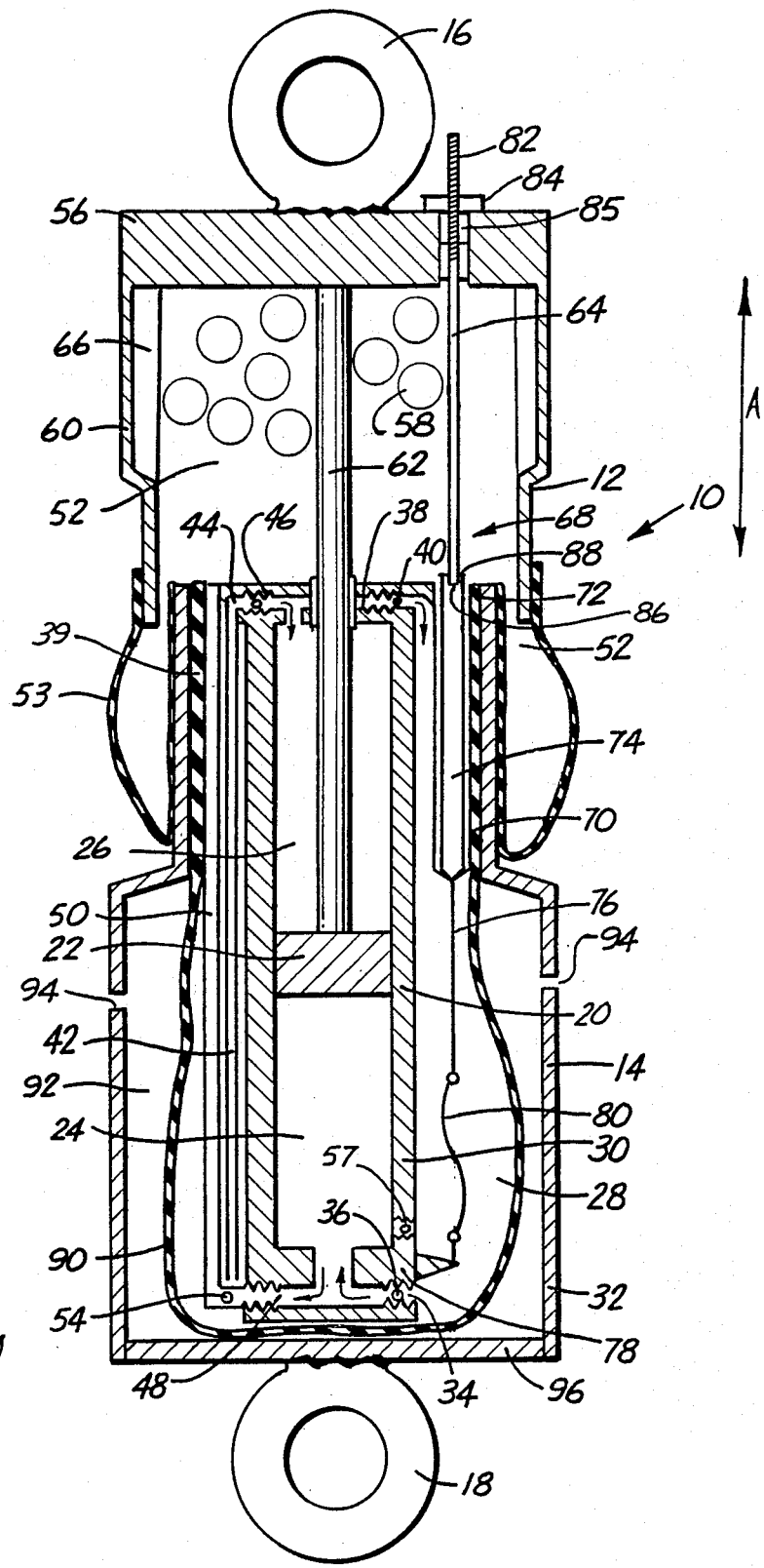
FIG. 1 is a cross sectional view of the self-leveling shock absorber unit of the present invention.

FIG. 1 illustrates a load leveling hydraulic shock absorber unit 10. Shock absorber 10 includes a piston assembly 12 mated with a cylinder assembly 14 allowing for extension and compression of the shock absorber between mounting rings 16 and 18.

Cylinder assembly 14 includes a cylinder 20 divided by piston 22 into compression chamber 24 and rebound chamber 26. Piston 22 is reciprocable in cylinder 20 for pumping damping liquid. Cylinder assembly 14 further includes an extensible reservoir bladder 28 disposed as a closed sleeve around cylinder body 30 including lower portion 78. Bladder 28 is sealed against outer wall 32 adjacent strip 39.

Damping liquid is delivered from extensible reservoir 28 to compression chamber 24 through passage 34 during rebound strokes of piston 22. Passage 34 includes a one-way valve 36 permitting fluid flow in one direction only as indicated by the arrow. One-way valve 36 may be provided by a check ball assembly, a spring and valve assembly, or by other techniques known to those skilled in the art. Liquid flows through one-way valve 36 when the liquid pressure in compression chamber 24 is less than the pressure in extensible reservoir 28. Rebound strokes occur when an axial force is applied to mounting rings 16 and 18 tending to pull apart piston assembly 12 and cylinder assembly 14, i.e., when piston 22 is pulled outward from cylinder 20 and the volume of compression chamber 24 is expanding.

Damping liquid is expelled from rebound chamber 26 into extensible reservoir 28 during rebound strokes. As piston 22 travels outward in cylinder 20, the volume of rebound chamber 26 decreases forcing liquid out of the chamber. Liquid passes from the top of rebound chamber 26 via passage 38 into reservoir 28. A one-way valve 40 permits flow in the outward direction only through passage 38. Valve 40 opens when the pressure of the fluid in rebound chamber 26 exceeds the pressure of the fluid in extensible reservoir 28.

Compression strokes of shock absorber 10 occur when piston 22 moves inward into cylinder 20, resulting in decreasing volume in compression chamber 24 and increasing volume in rebound chamber 26. Consequently, during compression strokes, damping liquid must be expelled from compression chamber 24 and supplied to rebound chamber 26. Liquid is supplied to rebound chamber 26 from extensible reservoir 28 via pickup tube 42 and passage 44. Pickup tube 42 extends from adjacent the bottom of extensible reservoir 28 to prevent pump cavitation which could result from the presence of small amounts of air in the upper portion of extensible reservoir 28. A one-way valve 46 permits liquid to pass in one direction only through passage 44. One-way valve 46 is a pressure responsive valve actuated by a pressure drop between extensible reservoir 28 and rebound chamber 26.

Liquid expelled from compression chamber 24 passes out of the chamber from the bottom thereof via passage 48 and tube 50 to a lift chamber 52. Pressure responsive one-way valve 54 permits liquid flow in passage 48 in the direction indicated by the arrow only. A limited quantity of liquid from may be compression chamber 24 directly to extensible reservoir 28 during compression strokes through optional one-way valve 57 through cylinder body 30. The through capacity of valve 57 is selected to control the rate of delivery of damping liquid to lift chamber 52.

Lift chamber 52 is axially aligned in the direction of reciprocation of piston 22 between cylinder body 30 and piston assembly upper plate 56, surrounding the upper end of piston rod 62. Lift chamber 52 is formed by upper plate 56 and a cylindrical skirt 60 extending from upper plate 56 toward cylinder body 30. A limitedly extensible wall 53 is attached to the outer surface of skirt 60 and the outer surface of cylinder body 30 to complete an enclosed plenum forming lift chamber 52. Wall 53 unfolds when shock absorber 10 is subjected to extension. Pressurization of lift chamber 52 with damping liquid subjects wall 53 to some extension, which the wall resists with increasing force as pressure increases. Wall 53 of lift chamber 52 is fairly stiff and shaped to conform to the space in which it is disposed, but nonetheless deforms under rapid compression strokes of shock absorber 10. Such deformation occurs below skirt 60.

Lift chamber 52 is partially filled with damping liquid, which varies in quantity depending upon the motion applied and the load carried by the shock. The balance of lift chamber 52 is filled with air or a gas which undergoes pressurization as the quantity of liquid in the chamber increases, and depressurization as the quantity of liquid in the chamber decreases. The gas is compressible and thus acts as an air spring.

An optional doughnut-shaped gas filled bag 66 is shown lining the interior wall of skirt 60. Where lift chamber 52 is substantially filed with liquid, upon pressurization of the lift chamber, liquid will press against bag 66 reducing the bag's volume and increasing compression of the gas in the bag. Transient shocks also act to compress gas bag 66. Additional cushioning can be provided by supplementing or replacing gas doughnut 66 with dispersed gas filled bags 58. The gas filled bags could alternatively be replaced with a compressible solid.

Damping liquid is drained from lift chamber 52 by a bleed valve 68. Bleed valve 68 functions as a one-way drain from lift chamber 52 into extensible reservoir 28. Unlike the other one-way valves used in shock absorber unit 10, bleed valve 68 is a displacement rather than pressure actuated. Bleed valve 68 includes a valve member seat 70 which is positioned through and attached to an upper radial extension 72 of cylinder body 32. Valve member seat 70 is tapered to limit the axial travel of an axially movable valve member 74. Valve member 74 has an axial extension 76 which is connected to a lower portion 78 of cylinder body 30 by a tensioning member 80. Tensioning member 80 pulls movable valve member 74 into valve member seat 70 to close bleed valve 68. Tensioning member 80 can be a tension spring or an elastic strap made of natural or artificial rubber.

Axial extensions of shock absorber 10 beyond the predetermined extension act to open bleed valve 68. Bleed valve actuating rod 64 includes an upper threaded portion 82 extending through threaded bore 85 in piston assembly upper plate 56. Nut 84 is tightened down on threaded portion 82 on the opposite side of plate 56 from lift chamber 52. Upward axial movement of piston assembly 12, corresponding to axial movement of piston 22 outward from cylinder 20, results in upward movement of bleed valve actuating rod 64. Actuating rod 64 extends into valve member 74, which is hollow, and terminates in a flushed end 86. Actuating rod 64 is sized to move freely in an open end 88 at the top of valve member 74, but the flush end 86 is wider than the open end and contacts against the body around the open end of the member upon sufficient retraction of rod 64.

The displacement of piston assembly 12 which corresponds to flush end 86 just contacting the inner top portion of valve member 74, but not acting to withdraw the valve member from valve member seat, is a distance indicated by the letter "A" and is the shock absorber extension which corresponds to a preferred spacing between the unsprung and sprung portions of a vehicle. The distance represented by "A" may be adjusted by screwing actuating rod 64 up or down in bore 85. Adjustment further inserting rod 64 will result in increased spacing between sprung and unsprung portions of the automobile. Retraction of rod 64 from valve member 74 results in flush end 86 contacting the top of the valve member pulling the valve member out of valve member seat 70 and opening bleed valve 68 reducing spacing "A".

Liquid drains from lift chamber 52 through bleed valve 68 into extensible reservoir 28. Extensible reservoir 28 is formed from a flexible sheet wall 90 disposed in an annular cavity 92 into which cylinder body 30 is substantially submerged. Annular cavity 92 is vented by vents 94 through cylinder assembly outer wall 32 allowing for expansion and contraction of extensible reservoir 28 unaffected by atmospheric pressure changes in annular cavity 92. Ambient atmosphere is drawn in and out of cavity 92 aiding in cooling of damping liquid circulating in shock absorber unit 10. Liquid passages 34 and 48 are disposed in lower portion 78 for supplying and removing liquid from compression chamber 24, respectively.

Figure 2:
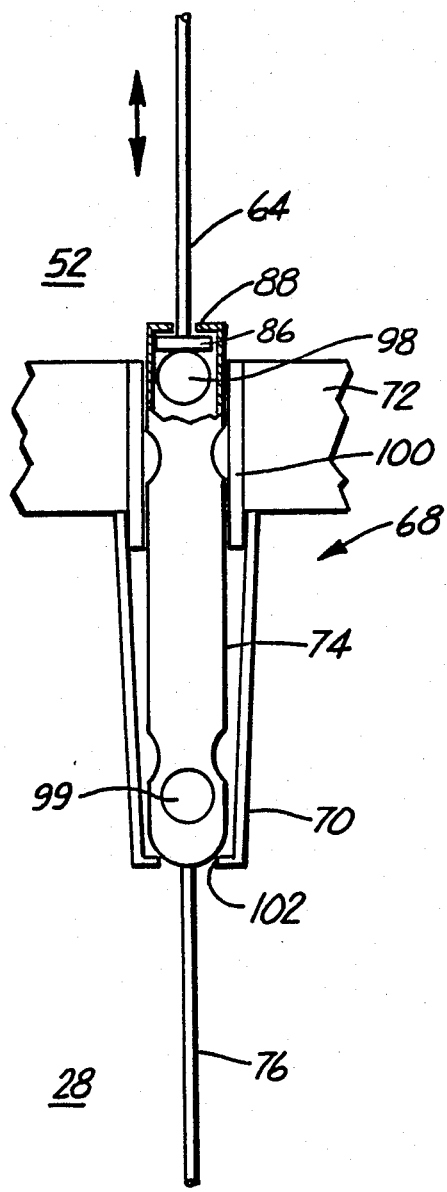
FIG. 2 is an enlarged fragmentary partial section view of the structure of the bleed valve.

FIG. 2 illustrates bleed valve 68 in detail. Movable valve member 74 is a hollow tube section with an opening 88 at its upper end which is sized to admit actuating rod 64 but not to pass flushed end 86 of the actuating rod. Movable valve member 74 slides through annular guide 100. Movable valve member 74 includes an upper cluster of holes 98 through the wall of the member located adjacent the upper end of the member. When bleed valve 68 is opened, that is, when valve member 74 is pulled partially out of valve member seat 70, liquid is admitted to the interior of member 74 through upper cluster 98 from lift bladder 52. Liquid passes out of valve member 74 through lower cluster of holes 99 and lower opening 102 into the interior of valve seat 70 when bleed valve 68 is opened. Lower opening 102 of valve member seat 70 is sized to limit the travel of valve member 74.

Figure 3:
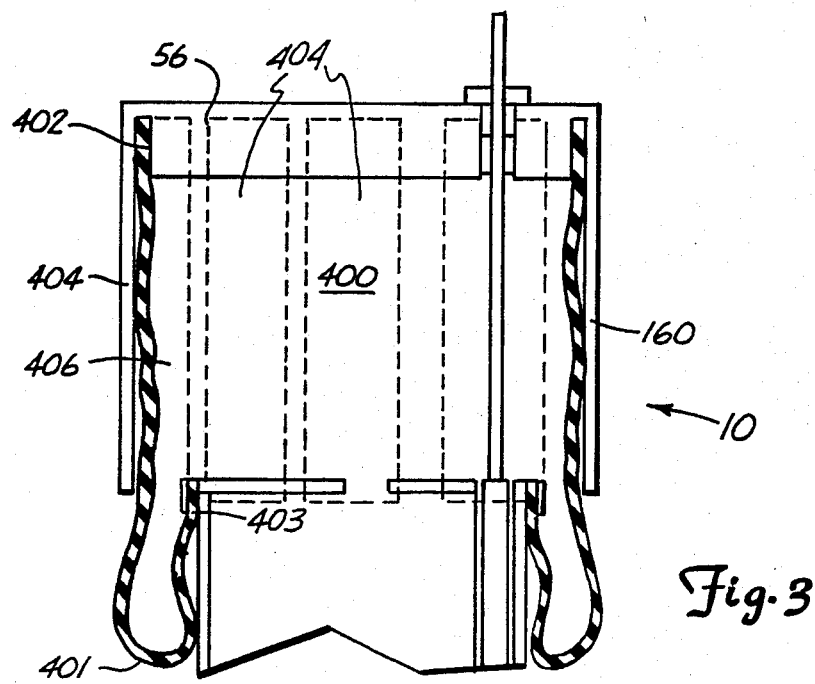
FIG. 3 is a cross sectional view of a second embodiment of the shock absorber unit.

FIG. 3 illustrates an alternative embodiment of shock absorber unit 10. Lift chamber 400 is provided by attaching a sleeve wall 406 between upper piston assembly plate 56 in recess 402 and outer wall 32 of cylinder body 32. Sleeve seal 406 is folded under itself and attached to outer wall 32 by band 403. Torsion retaining springs 404 are radially disposed around sleeve wall 406 for retaining sleeve 406 during transient shocks. Retaining springs become distended during pressurization of lift chamber 400, acting as torsion bar springs as an alternative or supplement to an air spring within the lift chamber.

Figure 4:
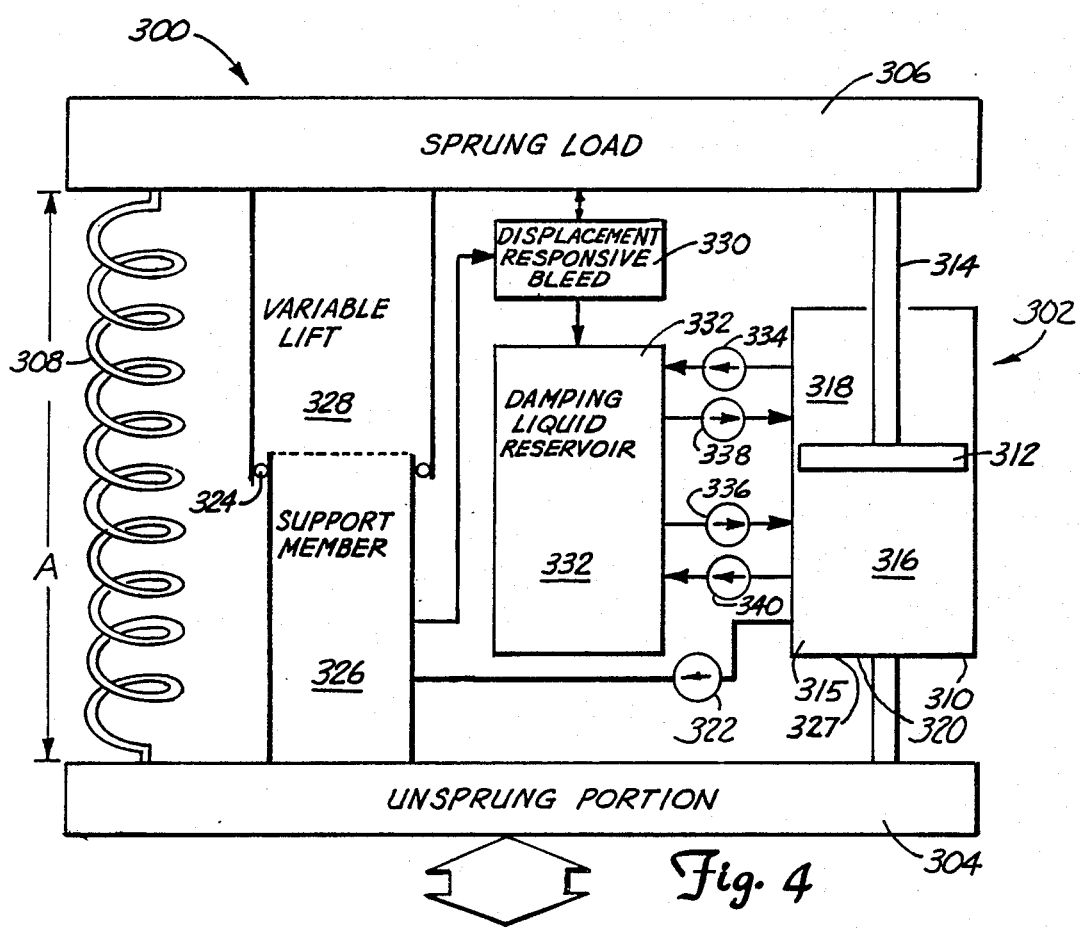
FIG. 4 is a schematic diagram of the fluid circuit of the self-leveling feature of the present shock absorber.

FIG. 4 is a schematic of a suspension 300 including a load leveling, shock absorbing fluid circuit 302. An unsprung portion 304 supports a sprung load by a spring 308. Fluid circuit 302 is adapted to both dampen oscillations of sprung load 306 of a vehicle such as an automobile or truck, as well as to maintain spacing between sprung load 306 and unsprung portion 304 despite variations in the mass of the load carried in the sprung load.

Externally generated mechanical energy is applied to unsprung portion 304 (indicated by the double arrow) and is transferred as axially reciprocating motion to suspension 300. Dash pot 310 is an axially reciprocating pump with a piston 312 positioned at the end of piston rod 314 in a cylinder 315 defining a variable volume compression chamber 316 and a variable volume rebound chamber 318. Both chambers are substantially filled with a damping liquid such as hydraulic oil. Piston rod is connected to sprung load 306. Cylinder 315 is disposed in a cylinder body 320 connected to unsprung portion 304.

Upward motion of unsprung portion 304 results in a compression stroke by piston 312, decreasing the volume of compression chamber 316 and ejecting oil from the compression chamber through one-way pressure sensitive valve 322 to variable lift support member 324. Liquid is transferred from compression chamber 316 to lift member 324 with each compression stroke.

Liquid is removed from lift member 324 through a displacement responsive bleed valve 330 and is returned to reservoir 332 when the displacement between sprung load 306 and unsprung load 304 exceeds the desired spacing "A". The rate of removal of damping liquid increases as displacement increases.

Lift member 324 supports the sprung load in parallel with spring 308. Lift member 324 is divided functionally into two portions, a damping liquid receiving plenum 326 and a spring portion 328. Spring portion 328 can be provided by a gas chamber which undergoes pressurization as liquid is introduced into liquid receiving plenum or by steel springs which become deformed, insuring the liquid is under increasing pressure and that greater amounts of potential energy are stored in compressive portion 328. Alternatively, a metal spring could be substituted for compressive portion 328.

Reservoir 332 supplies liquid to rebound chamber 318 during compression strokes via pressure responsive one-way valve 338. An optional one-way valve 340 transfers some of the liquid expelled from compression chamber 316 to reservoir 332.

During rebound strokes of piston 312, liquid is expelled from rebound chamber 318 and drawn into compression chamber 316. One-way valve 334 transfers liquid from rebound chamber 318 to reservoir 332 and one-way valve 336 allows passage of liquid from reservoir 332 into compression chamber 316.

Imposition of a large steady state compressive load on sprung load 306 results, with motion imposed to either unsprung portion 304 and/or sprung load 306, in the inflation and pressurization of lift member 324. A steady state compressive load implies a heavily loaded vehicle being supported by unit 302 and parallel spring 308. Such a loading of the vehicle results in an initial depression of the vehicle reducing the spacing between sprung load 306 and unsprung portion 304. Movement of the vehicle will result in application of transient motion to shock absorber 302. The transient motion will result in a net transfer of liquid from reservoir 332 to lift member 324 through compression chamber 316 until an equilibrium position, defined by bleed valve 330, is reached, at which point the bleed valve will begin returning additional liquid to the reservoir. Removal of the load from the vehicle will result in lifting of the vehicle, opening bleed valve 330. The vehicle thereupon returns substantially to its preferred height.

The present invention offers greater reliability than prior art air shock systems for achieving vehicle height adjustment. Air shocks have proven prone to leakage, especially in climates prone to extreme cold and require either the complication of an air pump or trips to sources of compressed air in order to be effectively used. The shock absorber of the present invention is readily fitted to existing autos and offers the reliability of oil shock absorbers.

Although the present invention has been described with reference to preferred embodiments, workers skilled in the art will recognize that changes may be made in form and detail without departing from the spirit and scope of the invention.

What is claimed is:

1. A telescoping hydraulic shock absorber unit comprising:
    a cylinder body having a cylinder charged with a damping medium;
    a piston disposed for axial reciprocation within the cylinder and dividing the cylinder into a compression chamber and a rebound chamber;
    a lift chamber disposed in relationship with the cylinder body and the piston for displacing the piston outwardly from the cylinder;
    a reservoir bladder; and
    a damping medium circuit path interconnecting the compression chamber, the rebound chamber, the lift chamber and the reservoir bladder including,
        first one-way valve means from the compression chamber to the lift chamber,
        a displacement responsive valve for passing damping medium from the lift chamber to the reservoir bladder when the piston is displaced outwardly in the cylinder beyond a predetermined level position;
        second one-way valve means from the reservoir bladder to the rebound chamber,
        third one-way valve means from the rebound chamber to the reservoir bladder, and
        fourth one-way valve means from the reservoir bladder to the compression chamber.

2. The shock absorber unit of claim 1 wherein the damping medium is liquid.

3. The shock absorber unit of claim 2 wherein the lift chamber further comprises an elastic portion, the extent of deformation of which is in part dependent upon the quantity of liquid in the lift chamber.

4. The shock absorber unit of claim 3 wherein the shock absorber unit is connected between spaced member, positionally fixing the piston with respect to a first member and the cylinder with respect to a second member and outward axial displacement of the piston from the cylinder is related to the displacement of the spaced members.

5. The shock absorber unit of claim 4 wherein the displacement responsive valve includes:
   a valve seat;
   a valve member movable outward from the valve seat;
   elastic means for biasing the valve member into the valve seat; and
   a lift rod attached with respect to the piston for lifting the valve member from the valve seat when the displacement of the piston outward in the cylinder exceeds the predetermined level position.

6. The shock absorber unit of claim 5 wherein the valve member of the displacement responsive valve includes a hollow tube closed at an end adjacent the valve seat and including opening distributed longitudinally along its body.

7. The shock absorber unit of claim 5 wherein the position of the lift rod is adjustable for changing the level position.

8. The shock absorber unit of claim 4 and further comprising fifth one-way valve means from the reservoir bladder.

9. The shock absorber of claim 4 and further comprising a piston rod connected between the piston and the first spaced member.

10. The shock absorber unit of claim 9 wherein the lift chamber is a plenum formed within a skirt disposed radially around and connected to the piston rod and an extensible wall between the skirt and the cylinder body.

11. The shock absorber unit of claim 10 wherein the elastic portion of the lift chamber is a gas filled portion of the lift chamber.

12. The shock absorber unit of claim 10 wherein the elastic portion of the lift chamber is a plurality to torsion bars.

13. A telescoping shock absorber with a predetermined normal extension, the shock absorber comprising:
   a damping fluid pump responsive to transient loading of shock absorber for pumping damping fluid;
   a pressurizable support chamber for maintaining the predetermined extension of the telescoping shock absorber;
   the support chamber including a compressible medium, the compression of which is in part dependent upon the quantity of damping fluid in the pressurizable support chamber;
   first one-way valve means for admitting damping fluid to the support chamber from the fluid pumping means during application of compressive force reducing the extension of the shock absorber; and
   extension responsive valve means for draining damping fluid from the pressurized support chamber when the shock absorber is extended beyond the predetermined extension.

14. The shock absorber of claim 13 wherein the damping fluid pump includes a cylinder and a reciprocable piston disposed in the cylinder separating the cylinder into a compression chamber and a rebound chamber.

15. The shock absorber of claim 14 and further including a reservoir for receiving damping fluid from the support chamber through the extension responsive valve.

16. The shock absorber of claim 15 and further including:
   second one-way valve means for delivering damping fluid from the reservoir to compression chamber; and
   the first one-way valve means for delivering damping fluid to the support chamber being connected from the compression chamber to the support chamber.

17. A hydraulic shock absorber unit for providing automatic maintenance of a predetermined spacing between a sprung load and an unsprung load where the mass of the sprung load is subject to change, the shock absorber unit comprising:
   a liquid-filled cylinder in a cylinder body;
   a piston disposed in the cylinder for dividing the cylinder into a variable volume compression chamber and a variable volume rebound chamber and axially reciprocable therein;
   means for connecting the shock absorber unit between the sprung load and the unsprung load such that piston has a fixed spacing relative to a point on one of the loads and the cylinder body has a fixed spacing relative to a point on the other load;
   a lift chamber axially disposed with the direction of reciprocation of the piston between the cylinder body and the load relative to which the piston has a fixed position; reservoir means for retaining excess liquid;
   first one-way valve means for passing liquid from the compression chamber to the lift chamber;
   bleed valve means for passing liquid from the lift chamber means to the reservoir means when the spacing between the sprung load and the unsprung load exceeds the predetermined spacing;
   second one-way valve means for passing liquid from the reservoir means to the rebound chamber;
   third one-way valve means for passing liquid from the rebound chamber to the reservoir means; and
   fourth one-way valve means for passing liquid from the reservoir means to the compression chamber.

18. The shock absorber unit of claim 17 wherein the lift chamber includes an elastic portion.

19. The shock absorber unit of claim 16 wherein the bleed valve means includes:
   a valve seat;
   a valve member movable outward from the valve seat;
   elastic means for biasing the valve member into the valve seat; and
   a lift rod attached with respect to the piston for lifting the valve member from the valve seat when the displacement of the sprung and unsprung loads exceeds the predetermined spacing.

20. The shock absorber unit of claim 17 wherein the valve member of the bleed valve means includes a hollow tube closed at its end adjacent the valve seat and including opening distributed longitudinally along its body.

21. The shock absorber unit of claim 19 wherein the lift rod is adjustable for changing the predetermined spacing.

* * * * *